(12) United States Patent
Shin et al.

(10) Patent No.: US 8,677,246 B2
(45) Date of Patent: Mar. 18, 2014

(54) USER INTERFACE CONTROL APPARATUS, USER INTERFACE CONTROL METHOD, PROGRAM, STORAGE MEDIUM STORING PROGRAM, AND INTEGRATED CIRCUIT

(75) Inventors: Hidehiko Shin, Osaka (JP); Hideaki Yajima, Osaka (JP)

(73) Assignee: Panasonic Corporation, Osaka (JP)

( * ) Notice: Subject to any disclaimer, the term of this patent is extended or adjusted under 35 U.S.C. 154(b) by 247 days.

(21) Appl. No.: 12/812,608

(22) PCT Filed: Jan. 15, 2009

(86) PCT No.: PCT/JP2009/000118
§ 371 (c)(1),
(2), (4) Date: Jul. 13, 2010

(87) PCT Pub. No.: WO2009/090872
PCT Pub. Date: Jul. 23, 2009

(65) Prior Publication Data
US 2010/0299610 A1  Nov. 25, 2010

(30) Foreign Application Priority Data

Jan. 15, 2008  (JP) ................................. 2008-005335

(51) Int. Cl.
*G06F 3/00* (2006.01)
(52) U.S. Cl.
USPC ........................................................ 715/739
(58) Field of Classification Search
USPC ..................... 715/739; 700/83; 719/328, 330
See application file for complete search history.

(56) References Cited

U.S. PATENT DOCUMENTS 6,182,094 B1    1/2001  Humpleman et al.
6,499,062 B1 *  12/2002  Shteyn .......................... 719/315
(Continued)

FOREIGN PATENT DOCUMENTS

JP  2000-513916  10/2000
JP  2001-356976  12/2001
(Continued)

OTHER PUBLICATIONS

Wendorft et al., "Remote Execution of HAVi Applications on Internet-Enabled Devices", IEEE Transactions on Consumer Electronics, v. 47, n.3, pp. 485-495, Aug. 2001.*

(Continued)

*Primary Examiner* — Stephen Hong
*Assistant Examiner* — Joseph R Burwell
(74) *Attorney, Agent, or Firm* — Wenderoth, Lind & Ponack, L.L.P.

(57) ABSTRACT

A user interface (UI) control apparatus connected to a remote appliance via a communication path. The UI control apparatus is capable of providing a suitable UI for a user which may be stored on the UI control apparatus or the remote appliance without the need of a data management server. The UI control apparatus including: a UI list obtaining unit configured to add information on a UI program stored in a remote appliance to a UI list which is information listing at least one UI program stored in the UI control apparatus, the remote appliance being connected to the UI control apparatus via a communication path; and a UI obtaining unit configured to (i) search the remote appliance and (ii) obtain, from the remote appliance, a UI program selected by a user from the UI list with the information on the UI program added to the UI list.

14 Claims, 16 Drawing Sheets

(56) References Cited

U.S. PATENT DOCUMENTS

| | | | |
|---|---|---|---|
| 6,963,784 B1* | 11/2005 | Gibbs | 700/94 |
| 6,981,044 B1* | 12/2005 | Coez et al. | 709/226 |
| 7,136,709 B2* | 11/2006 | Arling et al. | 700/65 |
| 7,257,821 B2* | 8/2007 | Wendorf et al. | 719/328 |
| 2002/0188937 A1* | 12/2002 | Webster et al. | 717/171 |
| 2003/0185156 A1* | 10/2003 | Sato et al. | 370/235 |
| 2004/0081200 A1* | 4/2004 | Vollmer et al. | 370/468 |
| 2004/0098513 A1 | 5/2004 | Hutter et al. | |
| 2005/0246409 A1* | 11/2005 | Weber | 709/200 |
| 2006/0184851 A1* | 8/2006 | Froidcoeur et al. | 714/746 |
| 2007/0053513 A1* | 3/2007 | Hoffberg | 380/201 |
| 2008/0147212 A1* | 6/2008 | Monma et al. | 700/90 |

FOREIGN PATENT DOCUMENTS

| | | |
|---|---|---|
| JP | 2003-036180 | 2/2003 |
| JP | 2004-535625 | 11/2004 |
| JP | 2004-341880 | 12/2004 |
| JP | 2006-146404 | 6/2006 |
| WO | 02/087162 | 10/2002 |

OTHER PUBLICATIONS

Teirikangas, "HAVi: Home Audio Video Interoperability", pp. 1-10, Dec. 2001.*

Lea et al., "Networking home entertainment devices with HAVi," Computer, vol. 33, No. 9, pp. 35-43, Sep. 2000.*

International Search Report issued Feb. 17, 2009 in International (PCT) Application No. PCT/JP2009/000118.

English Language Translation of JP 2001-356976, which was published Dec. 26, 2001.

* cited by examiner

FIG. 5(A)

UI list of appliance "A" ~500

| Appliance name | Category | Function | Address | Version | Usability |
|---|---|---|---|---|---|
| Appliance "A" | Recorder | Picture display function | http://A/photoUI.html | 00001 | A |
| Appliance "A" | Recorder | Text editing function | http://A/fepUI.html | 00002 | B |

UI list of appliance "B" ~510

| Appliance name | Category | Function | Address | Version | Usability |
|---|---|---|---|---|---|
| Appliance "B" | Cellular phone | Picture display function | http://B/photoUI.html | 00002 | B |
| Appliance "B" | Cellular phone | Text editing function | http://B/fepUI.html | 00001 | A |
| Appliance "B" | Cellular phone | Speech display function | http://B/phoneUI.html | 00002 | B |

UI list stored in appliance "A" — 600

| Appliance name | Category | Function | Address | Version | Usability |
|---|---|---|---|---|---|
| Appliance "A" | Recorder | Picture display function | http://A/photoUI.html | 00001 | A |
| Appliance "A" | Recorder | Text editing function | http://A/fepUI.html | 00002 | B |
| Appliance "B" | Cellular phone | Picture display function | http://B/photoUI.html | 00002 | B |
| Appliance "B" | Cellular phone | Text editing function | http://B/fepUI.html | 00001 | A |
| Appliance "B" | Cellular phone | Speech display function | http://B/phoneUI.html | 00002 | B |

```
<html>
<head>
  <script>
    function loadBody(){                            ⎫
      document.getElementById('photo1').src="A.jpg"; ⎬ 1102
    }                                               ⎭
  </script>
</head>
<body onload="loadBody()">   }1103
  <img id="photo1"><br>      }1104
</body>
</html>
```

1101 brackets `<script>...</script>`

1100 UI program

USER INTERFACE CONTROL APPARATUS, USER INTERFACE CONTROL METHOD, PROGRAM, STORAGE MEDIUM STORING PROGRAM, AND INTEGRATED CIRCUIT

TECHNICAL FIELD

The present invention relates to user interface (hereinafter referred to as a UI) control apparatuses, UI control methods, UI control programs, storage media storing a UI control program, and UI integrated circuits which are capable of providing a most suitable UI for the user with a plurality of appliances working together.

BACKGROUND ART

A conventional technique employed for a UI control apparatus causes a data management server to (i) consolidate models of a user's home electrical appliances, and update states, and (ii) provide update data to a home electrical appliance accessible to a network.

Such a conventional technique is described in, for example, Patent Reference 1.
Patent Reference 1: Japanese Unexamined Patent Application Publication No. 2004-341880

SUMMARY OF THE INVENTION

Problems that Invention is to Solve

The conventional technique requires a data management server connected to a network in order to update a UI. Thus, the update of the UI needs to be executed via the data management server. Hence, the conventional technique is incapable of providing the most suitable UI for a user without the data management server.

The present invention is conceived in view of the above problem and has as an object to provide a UI control apparatus which is capable of providing the most suitable UI for the user without a data management server.

Means to Solve the Problems

In order to achieve the above object, a UI control apparatus according to an aspect of the present invention is included in an appliance and performs a UI function. The UI control apparatus includes: a UI storage unit which stores at least one UI program executing a function in response to a command to the appliance by a user; a UI list storage unit which stores a UI list having information listing the UI program stored in the UI storage unit; a UI list obtaining unit which (i) obtains a list of a UI program stored in a remote appliance connected to the appliance via a communication path, and (ii) additionally registers the list in the UI list stored in the UI list storage unit, the list of the UI program being obtained from the remote appliance; a request receiving unit which receives a request from the user for a use of a UI; a UI selecting unit which selects at least one UI program corresponding to the UI, which is received by the request receiving unit, out of a UI program registered in the UI list by referring to the UI list stored in the UI list storage unit; a UI obtaining unit which (i) determines whether or not the UI program selected by the UI selecting unit is stored in the UI storage unit, and, in the case where the UI program is determined to be stored in the UI storage unit, (ii) reads to obtain the UI program from the UI storage unit; and a displaying unit which displays information to the user by executing the UI program obtained by the UI obtaining unit.

In the case where the UI obtaining unit determines that the UI program selected by the UI selecting unit is not stored in the UI storage unit, the UI obtaining unit may obtain the UI program from the remote appliance via the communication path, and the displaying unit may execute the UI program obtained from the remote appliance by the UI obtaining unit.

The UI obtaining unit may further include a UI delegating unit which delegates to the remote appliance execution of the UI program selected by the UI selecting unit in the case where the UI selecting unit determines that the UI program is not stored in the UI storage unit.

The above structure makes possible (i) obtaining to execute a UI program via a remote appliance without a data management server, and (ii) delegating execution of the UI program to the remote appliance. Therefore, the present invention is effective in (i) causing appliances to work together in order to update a UI without a data management server, and (ii) providing the most suitable UI for the user.

Effects of the Invention

A UI control apparatus according to an aspect of the present invention is effective in (i) causing appliances to work together in order to update a UI without a data management server, and (ii) providing the most suitable UI for the user.

The present invention improves UI capabilities of appliances. In particular, the present invention is significantly high in practical value today since the growth of home networking has allowed the appliances to work together.

BRIEF DESCRIPTION OF DRAWINGS

FIGS. 5(A) and 5(B) respectively show (i) a UI list of an appliance "A" according to Embodiment 1 of the present invention, and (ii) a UI list of an appliance "B" according to Embodiment 1 of the present invention.

FIG. 6 shows UI list information stored in the appliance "A" according to Embodiment 1 of the present invention.

FIG. 11 exemplifies a UI program according to Embodiment 2 of the present invention.

NUMERICAL REFERENCES

Figure 1:
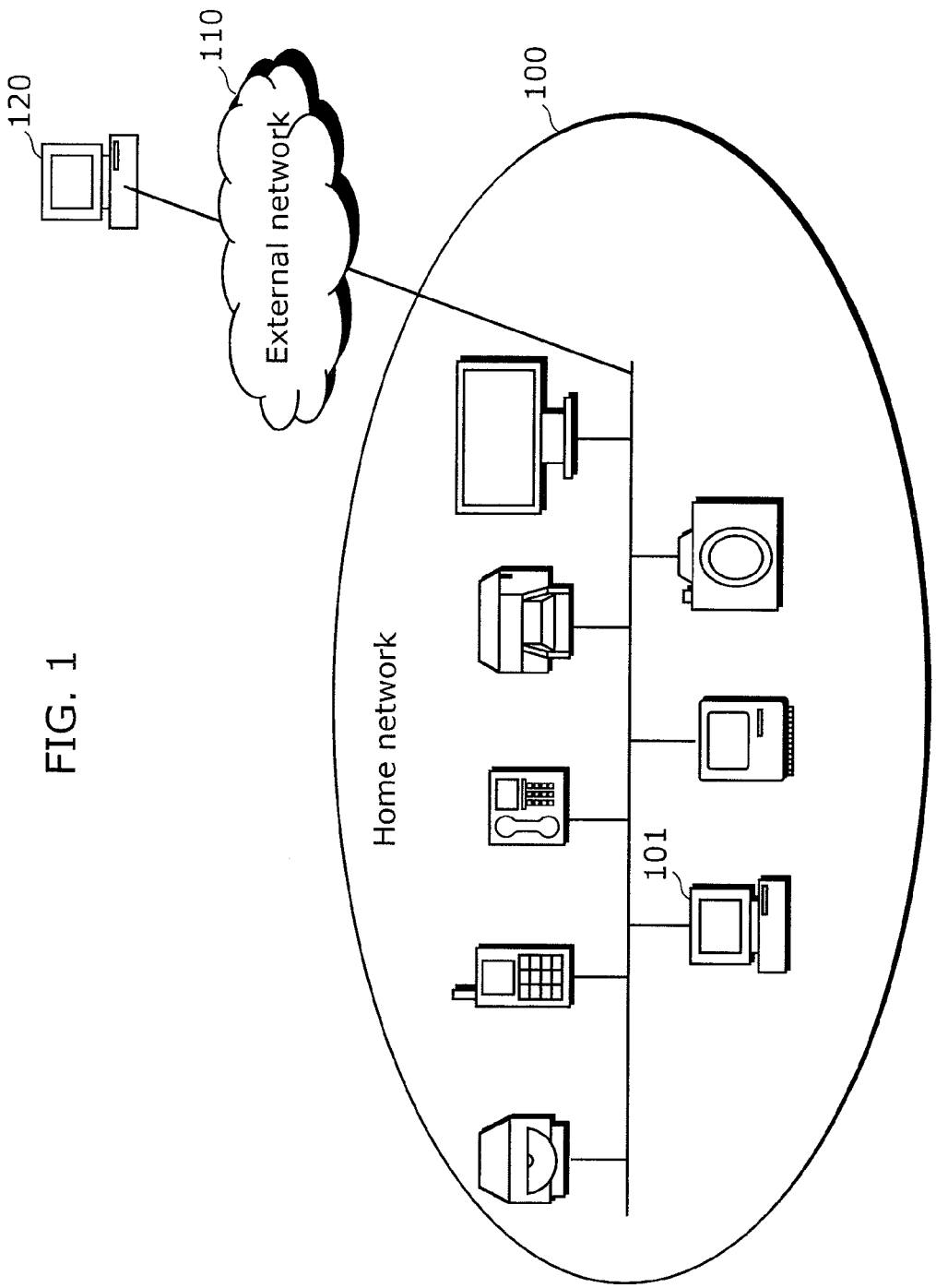
FIG. 1 is a network block diagram of an appliance including a UI control apparatus according to Embodiment 1 of the present invention.

100 Home network
101 Local appliance including a UI control apparatus
110 External network
120 Remote appliance
200, 800, 1300, and 1600 UI control apparatus
201 Notification receiving unit
202 UI list obtaining unit
203 UI list storage unit
204 and 1603 Request receiving unit
205 UI selecting unit
206 and 206a UI obtaining unit
207 UI storage unit
208, 806, and 1608 Displaying unit
210 User
500 UI list of an appliance "A"
501 to 505 UI list
510 UI list of an appliance "B"
600 UI list stored in the appliance A
601 to 605 UI list
700 Example of information on the UI stored in the appliance "A"
710 Example of a UI program stored in the appliance "A"
801 Resource priority level setting unit
802 Resource priority level storage unit
803 UI analyzing unit
804 Resource obtaining unit
805 Resource storage unit
1100 UI program
1101 Details of a function referred to as "function loadBody"
1102 Processing details of "function loadBody"
1103 Function referred to as "function loadBody"
1104 HTML element for displaying a picture
1200 and 1210 Monitor display example
1201 and 1211 Image resource
1301 UI delegating unit
1302 Temporally storage unit
1500 TV
1501 Player
1502 Cellular phone
1510 Player operating monitor
1511 Cellular phone operating display
1512 to 1515 Text editing display
1601 Function list obtaining unit
1602 Function list storage unit
1604 Function access detecting unit
1605 Function selecting unit
1606 Function result obtaining unit
1607 Function storage unit

DETAILED DESCRIPTION OF THE INVENTION

Described hereinafter is a UI control apparatus according to Embodiments of the present invention with reference to the drawings. It is noted that a UI is implemented by a UI program corresponding the UI. Here, the UI program achieves a function executed in response to a user's command given to an apparatus. Such a program defines an information display format shown to the user and a data entry method of the user. For example, the UI program may be (i) a program including an HTML browser such as Internet Explorer (Registered Mark), (ii) an executable format program or a script format program both executed on a virtual machine such as Java (Registered Mark), or (iii) a program capable of displaying a picture, editing text, and displaying characters of speech recognition.

Embodiment 1

Described first is a UI control apparatus according to Embodiment 1 of the present invention.

FIG. 1 is a network block diagram of a UI control apparatus according to Embodiment 1 of the present invention. A home network 100, including a local appliance 101 having a UI control apparatus, is formed in a wireless network or a wired network. The local appliance 101 includes a TV, a recorder, a player, a cellular phone, a fixed-line phone, a printer, a FAX machine, a personal digital assistance (PDA), a PC, a digital camera, a refrigerator, a microwave, and a washing machine. A remote appliance 120 also includes a TV, a recorder, a player, a cellular phone, a fixed-line phone, a printer, a FAX machine, a personal digital assistance (PDA), a PC, a digital camera, a refrigerator, a microwave, and a washing machine.

The home network 100 is connected to the remote appliance 120 via an external network 110. The local appliance 101 and the remote appliance 120 work together to update the UI of local appliance 101. The remote appliance 120 may be an appliance found in the home network 100. In this case, the local appliance 101 and the remote appliance 120 found in the home network 100 work together to handle processing such as updating the UI of the local appliance 101.

Figure 2:
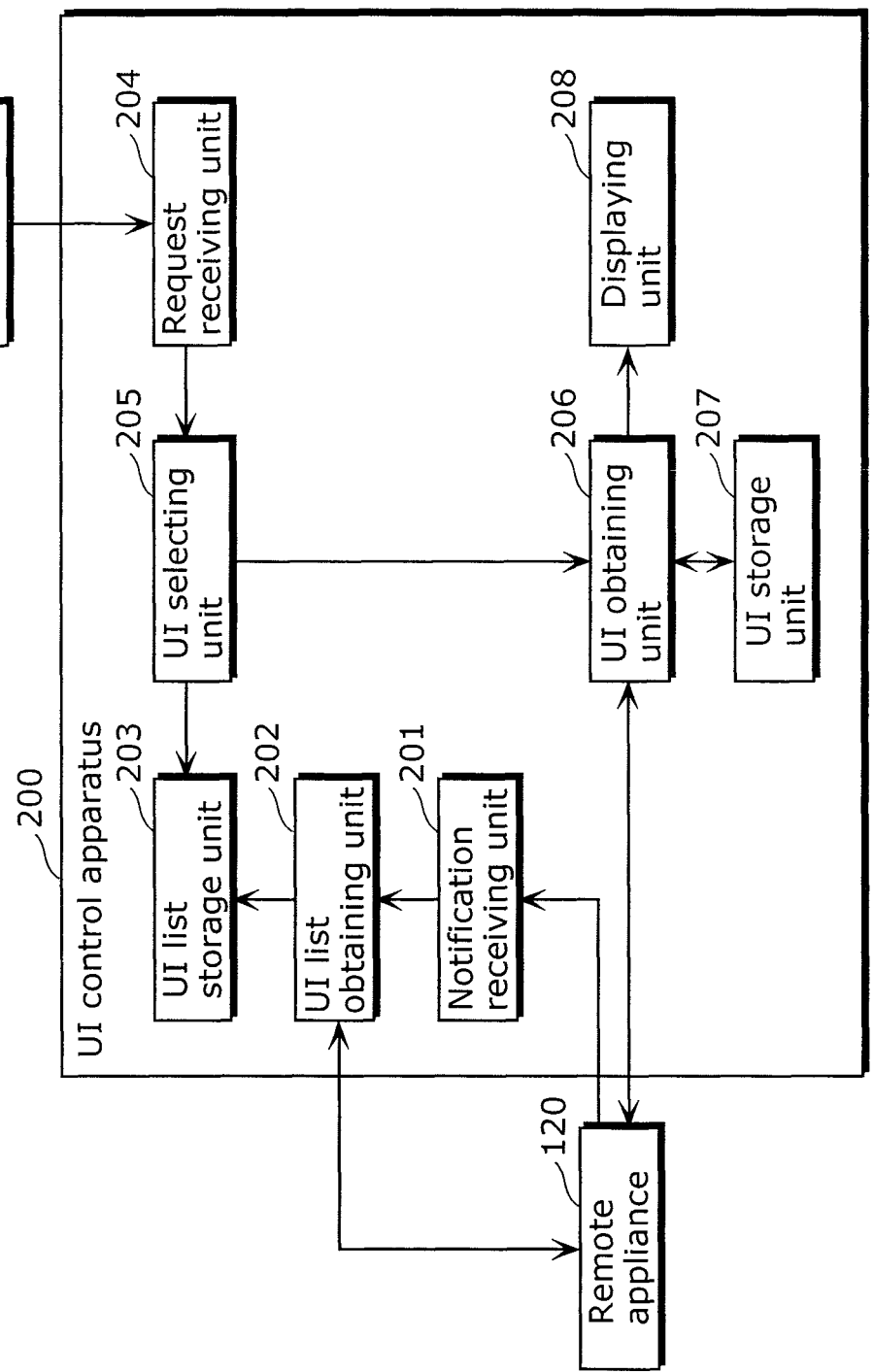
FIG. 2 shows the UI control apparatus according to Embodiment 1 of the present invention.

Described below is an operation of the UI control apparatus structured above. FIG. 2 is a block diagram of a UI control apparatus 200 according to Embodiment 1. The UI control apparatus 200 is included in an appliance such as a TV and achieves a user interface function. The UI control apparatus 200 includes a notification receiving unit 201, a UI list obtaining unit 202, a UI list storage unit 203, a request receiving unit 204, a UI selecting unit 205, a UI obtaining unit 206, a UI storage unit 207, and a displaying unit 208. FIG. 2 also illustrates the remote appliance 120 and a user 210.

The notification receiving unit 201, such as a network interface card, receives notification from the remote appliance 120. When the remote appliance 120 participates in the home network 100 either via the external network 110, or directly, the notification indicates that the remote appliance 120 has joined the home network 100. This notification may be sent to all the appliances found in the home network 100.

The UI storage unit 207 is a nonvolatile memory storing various UI programs executing functions. The functions are executed in response to a command, of the user, given to an appliance including the UI control apparatus 200.

The UI list storage unit 203 is a nonvolatile memory storing a UI list showing a list of information on a UI program stored in the UI storage unit 207.

The UI list obtaining unit 202 obtains from the remote appliance 120 a list of a UI program (UI list) which the remote appliance 120 has. In the case where there are two or more of the participating remote appliances 120, lists of UI programs (UI list) may be obtained from all of the appliances. Then, the obtained UI list is stored in the UI list storage unit 203.

The request receiving unit 204 is an operating button used for receiving a command, from the user 210, requesting a use of a UI.

Out of the UI list stored in the UI list storage unit 203, the UI selecting unit 205 selects the most suitable UI program which the user 210 desires to use.

The UI obtaining unit 206 obtains the most suitable UI program. Specifically, the UI obtaining unit 206 determines whether or not the most suitable program selected by the UI selecting unit 205 is stored in the UI storage unit 207. In the case where the UI obtaining unit 206 determines that the most suitable UI program is stored in the UI storage unit 207, the UI obtaining unit 206 reads the UI program from the UI storage unit 207. In the case where the UI obtaining unit 206 determines that the most suitable UI program is not stored in the UI storage unit 207, the UI obtaining unit 206 obtains the UI program from the remote appliance 120 via the home network 100, and stores the obtained UI program in the UI storage unit 207.

The displaying unit 208 includes an execution engine such as (i) a virtual machine executing a UI program, and (ii) a display monitor such as a liquid crystal display (LCD) display. The displaying unit 208 executes the UI program obtained by the UI obtaining unit 206 to display the UI (information on execution of the UI program) on the monitor for the user 210.

Each of the notification receiving unit 201, the UI list obtaining unit 202, the request receiving unit 204, the UI selecting unit 205, the UI obtaining unit 206, and the displaying unit 208 may be implemented in a form of (i) hardware including a dedicated electronic circuit and (ii) a program executed in a computing environment having hardware. The hardware in the computing environment includes a central processing unit (CPU), a memory including a read-only memory (ROM) and a random access memory (RAM), and a communications interface. The same goes for the other Embodiments.

Figure 3:
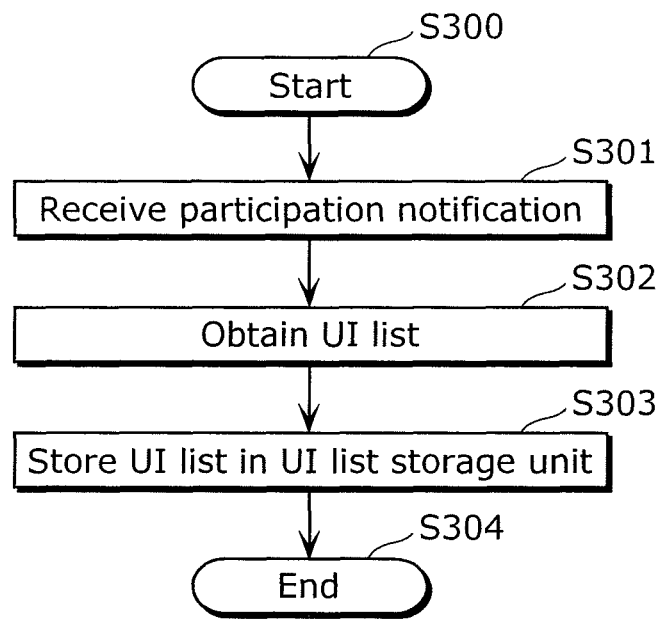
FIG. 3 is a flow chart showing a flow of storing a UI list according to Embodiment 1 of the present invention.

FIG. 3 shows a flow of processing which covers the participation of the remote appliance 120 in the home network 100 through the storage of the UI list.

When the processing starts (S300), and the remote appliance 120 participates in the home network 100 via the external network 110 or directly, the notification receiving unit 201 receives participation notification from the remote appliance 120 (S301). Upon receiving the participation notification, the notification receiving unit 201 instructs the UI list obtaining unit 202 to obtain the UI list. When receiving the direction from the notification receiving unit 201, the UI list obtaining unit 202 obtains the UI list from the remote appliance 120 (S302). Then, the UI list obtaining unit 202 stores the obtained UI list in the UI list storage unit 203 (S303), and the processing ends (S304).

Here, specific flows of processing examples are shown using FIGS. 3, 5, and 6. In the description, the local appliance 101 is referred to as an appliance "A", and the remote appliance 120 as an appliance "B". It is assumed that: the appliance "A" has UI programs corresponding to rows 501 and 502 in FIG. 5 (A); and a UI list 500 shown in FIG. 5 (A) is stored in the UI list storage unit 203. It is also assumed that the appliance "B" has: UI programs corresponding to rows 503, 504, and 505 in FIG. 5 (B); and a UI list 510, of the appliance "B", shown in FIG. 5 (B).

A name of an appliance is stored under "Appliance name" shown in FIGS. 5 (A) and (B). Here, the local appliance 101 and the remote appliance 120 are the appliances "A" and "B", respectively. Thus, the appliances "A" and "B" are listed. "Category" shows a category to which an appliance belongs to. The appliances "A" and "B" respectively belong to "Recorder" and "Cellular phone". "Function" shows a function of a UI available for each appliance. The appliance "A" has a picture display function and a text editing function. The appliance "B" has a picture display function, a text editing function, and a speech display function. "Address" shows information (a storage location of a UI program) used for accessing an appropriate function (UI program). When the user 210 would like to access the picture display function of the appliance, the user 210 accesses http://A/photoUI.html. "Version" shows a version of a UI program having an appropriate function. The version of the UI program having the picture display function of the appliance "A" is 00001. "Usability" shows usability of a UI program. The usability of the UI having the picture display function of the appliance "A" is "A", which shows that the UI program is easy to use. It is noted that these items may be either previously included in the UI list, or set by the user 210.

When the appliance "B" participates in the home network 100 via the external network 110 or directly, the appliance "A" receives participation notification from the appliance "B" (S301). Upon receiving the participation notification, the appliance "A" obtains from the appliance "B" the UI list of the appliance "B" (S302). Then, the appliance "A" stores the obtained UI list to merge the UI list held therein with the obtained UI list (S303). FIG. 6 exemplifies a UI list merged and stored in the appliance "A". A UI list 600 stored in the appliance "A" is a combined list of the UI list 500 of the appliance "A" in FIG. 5 (A) and the UI list 510 of the appliance "B" in FIG. 5 (B). Simultaneously, the UI list 600 may be edited so that only necessary items are included in the list when the appliance "A" obtains the UI list from the appliance "B".

Figure 4:
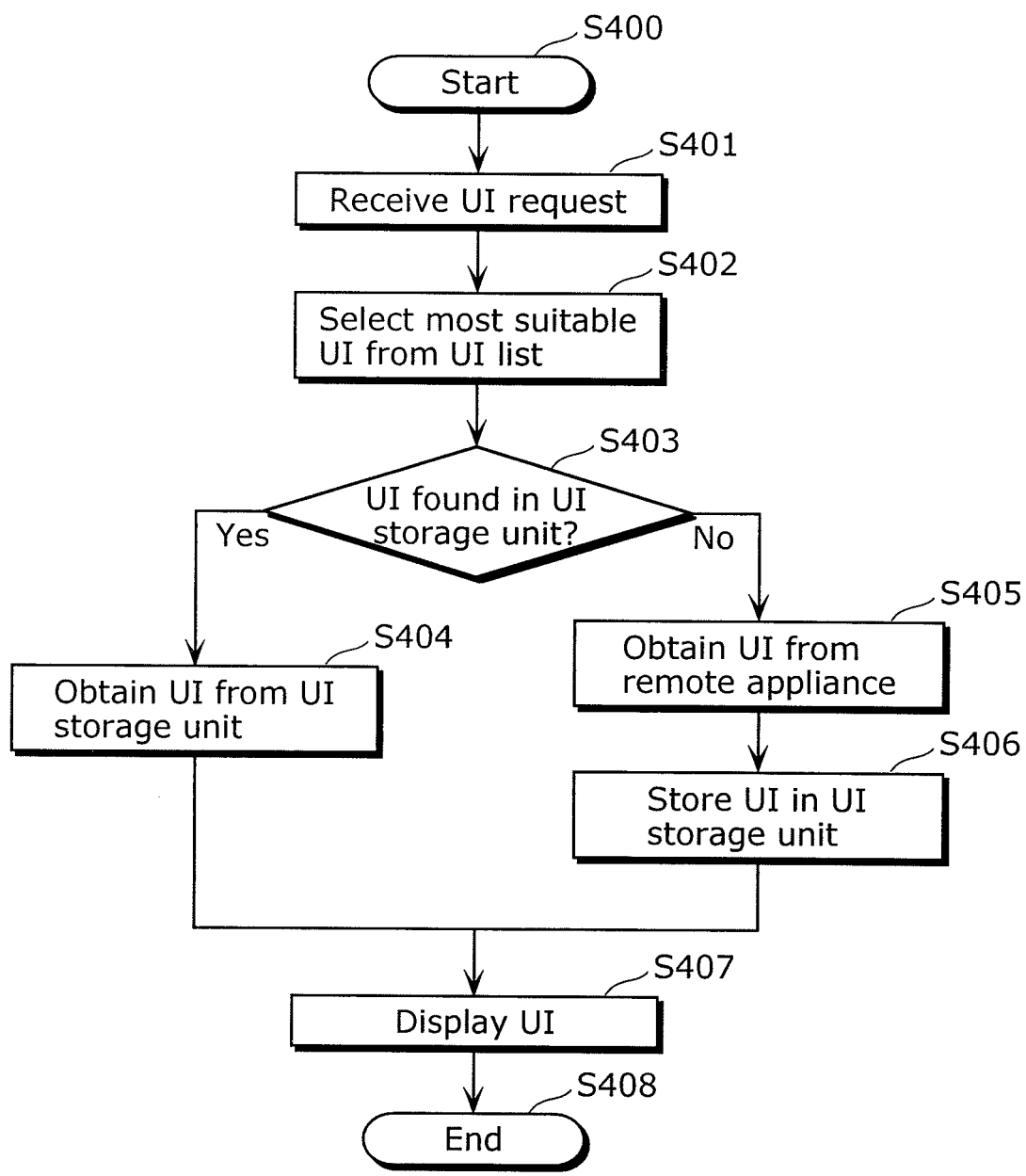
FIG. 4 is a flow chart showing a flow of displaying information on execution of a UI program according to Embodiment 1 of the present invention.

FIG. 4 shows a flow of processing which covers the use request of a UI by the user 210 through the display of the UI (information on execution of the UI program). When the processing starts (S400), and the request receiving unit 204 receives a UI request for the use of a UI (S401), the request receiving unit 204 instructs the UI selecting unit 205 to select the most suitable UI program. Upon receiving the instruction from the request receiving unit 204, the UI selecting unit 205 selects the most suitable UI program which the user 210 desires to use from the UI list stored in the UI list storage unit 203 (S402).

Any given priority may be used for the selection. For example, the UI selecting unit 205 may give a priority to the remote appliance 120 which belongs to the same category. The UI selecting unit 205 may give a priority to version. When the category is prioritized, the search is conducted based on category. When the version is prioritized, the search is conducted based on version. When the UI selecting unit 205 gives a priority to usability, the search is conducted based on usability. Furthermore, the UI list stored in the UI list storage unit 203 includes information on functions held in a UI program. The UI selecting unit 205 may make a selection based on the information. The most suitable UI program may be determined by combining information found in a UI list. Several searched results may be found. Out of the several searched results, the user 210 may select a UI to use. In other words, at least one of "Category", "Version", and "Usability" included in the UI list is employed as a priority level for selecting the most suitable UI program.

In the case where a UI program of the local appliance 101 and a UI program of the remote appliance 120 cannot be simultaneously used, the case may be notified to the local appliance 101, and reflected in the UI list stored in the local appliance 101. Here, when the local appliance 101 selects a UI program which cannot be simultaneously used as the most suitable UI program, the next most suitable UI program may be sequentially searched.

Even though the most suitable UI program is selected, there is a case where (i) no display function is found to be implemented in software or hardware required to display the UI (information on the execution of the UI program) of the most suitable UI program, or (ii) no operation function for an operation is found. In such a case, the next suitable UI program may be sequentially searched. When there is no display function implemented in hardware, the UI selecting unit 205 may select software as the most suitable UI program as far as the software is substitutable as a display function. As indexes for searching for the most suitable UI program, employed may be UI program usage frequency, a monitor size, a content size, and information on conformity to the source of screen transition. Then, when selecting the most suitable UI program, the UI selecting unit 205 notifies of the UI obtaining unit 206 an address at which the most suitable UI program is found.

Then, the UI selecting unit 205 notifies the UI obtaining unit 206 of the selected UI program's address. Upon receiving the notification from the UI selecting unit 205, the UI obtaining unit 206 uses the address received from the UI selecting unit 205 to confirm whether or not the UI program selected by the UI selecting unit 205 is found in the UI storage unit 207 (S403). When an appropriate UI program is found in the UI storage unit 207 (S403: Yes), the UI obtaining unit 206 obtains the UI program from the UI storage unit 207 (S404). Concurrently, when no most suitable UI program is found in the UI storage unit 207 (S403: No), the UI obtaining unit 206 obtains an appropriate UI program from the remote appliance 120 based on the address received from the UI selecting unit 205 (S405), and stores the obtained UI program in the UI storage unit 207 (S406). Next, the UI obtaining unit 206 instructs the displaying unit 208 to display the obtained UI (information on execution of the UI program). Receiving the instruction, the displaying unit 208 displays on the monitor the UI (information on execution of the UI program) obtained by the UI obtaining unit 206 (S407). Then, the processing ends (S408). It is noted that the UI storage unit 207 may store the address of the UI program obtained from the remote appliance 120, instead of the UI program. Here, when the user 210 once again requests the UI, the UI obtaining unit 206 can reuse the address to access the remote appliance 120 in order to obtain the UI program.

Figure 7:
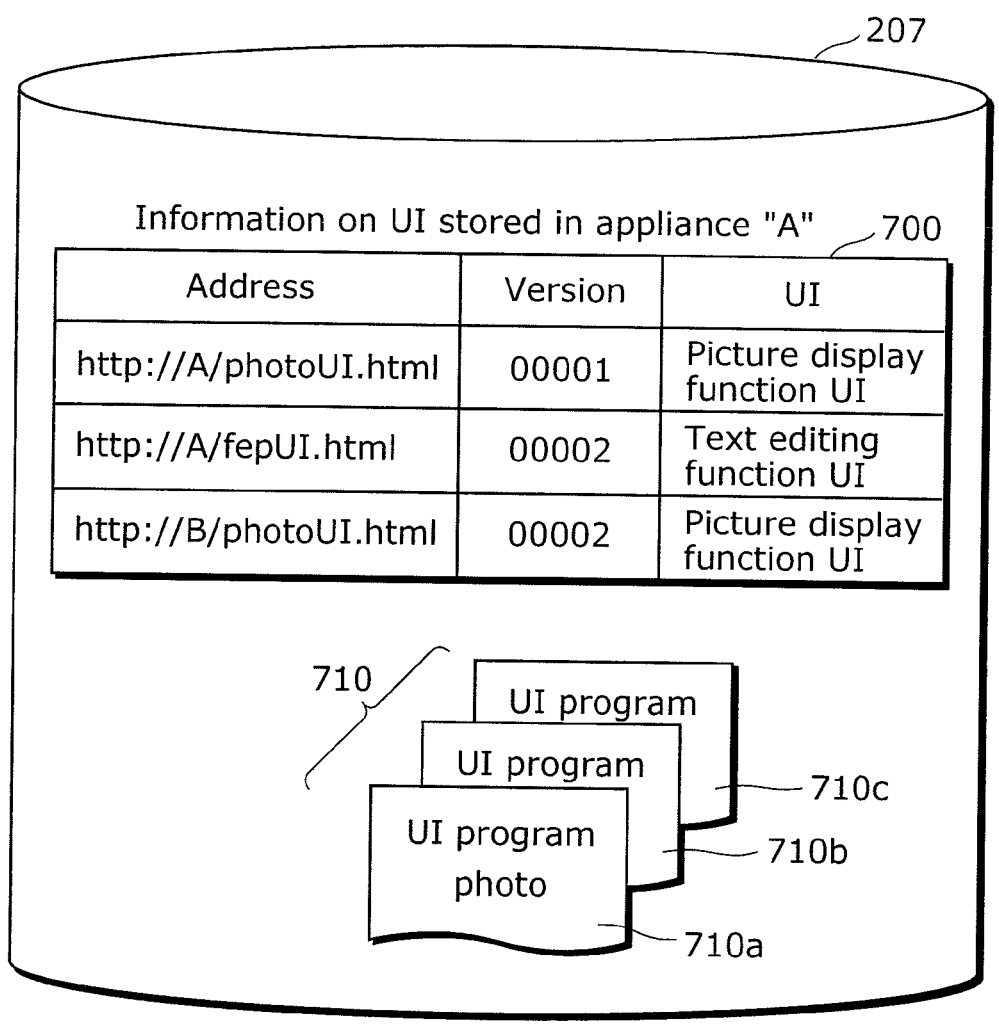
FIG. 7 shows information on the UI stored in the appliance "A" according to Embodiment 1 of the present invention.

Here, specific flows of processing examples are shown using FIGS. 4, 6, and 7. In the description, as well, the local appliance 101 is referred to as an appliance "A", and the remote appliance 120 as an appliance "B". Assumed here is that: the appliance "B" has already participated in the home network 100; the UI list 600 stored in the appliance "A" of FIG. 6 has already been stored in the UI list storage unit 203 of the appliance "A"; and the user 210 has not made a request yet. The appliance "A" stores in the UI storage unit 207 the UI programs corresponding to the rows 501 and 502 of FIG. 5 (A).

Here, the appliance "A" is assumed to receive a UI request from the user 210 indicating that the user 210 is asking for a UI capable of picture display (S401). Then, the appliance "A" selects a UI program having the most suitable picture display function out of the UI list 600 stored in the appliance "A" of FIG. 6 (S402).

Described here is a specific example of giving version priority. The appliance "A" searches the UI list 600 stored in the appliance "A" for a UI program having a picture display function. The programs having the picture display function are the UI programs corresponding to rows 601 and 603. Next, the UI selecting unit searches for the UI programs corresponding to the rows 601 and 603 under version. Here, the UI program corresponding to the row 603 has a version higher than that of the UI program corresponding to the row 601. Thus, selected is the UI program corresponding to the row 603.

The UI program corresponding to the row 603 is in the appliance "B", and has not been stored in the UI storage unit 207 (S403: No). Thus, the UI obtaining unit 206 obtains the UI program corresponding to the row 603 (S405). In obtaining the UI program corresponding to the row 603, the UI obtaining unit 206 uses the address of the UI program http://B/photoUI.html. It is noted that used here is the Hyper Text Transfer Protocol (HTTP); concurrently, the protocol shall not be limited to the HTTP as far as the address can specify the appliance. Then, the UI storage unit 207 stores the obtained UI program corresponding to the row 603 (S406).

FIG. 7 exemplifies the UI storage unit 207, in the appliance "A", after obtaining the UI program from the appliance "B". Exemplified here are UI programs 710 stored in the appliance "A", and information 700 on the UI programs 710. The information 700 on the UI programs 710 stored in the appliance "A" includes (i) a UI program 710*a* corresponding to the row 501, (ii) a UI program 710*b* corresponding to the row 502, and (iii) a UI program 710*c* corresponding to the row 503. Here, the appliance "A" originally has the rows 501 and 502 shown in FIG. 5 (A); concurrently, the row 503 shown in FIG. 5 (B) is additionally obtained from the appliance "B". It is noted that the example involves conducting a search based on version so that version information is included; simultaneously, other information such as usability may be added. In addition, the UI storage unit 207 may store either information on the UI program and the address alone, or the address alone.

Then, the appliance "A" displays a UI (information on execution of the UI program) corresponding to the obtained row 603 (S407), and the processing ends (S408).

Embodiment 1 involves obtaining a required UI program from a remote appliance and executing the UI program without a data management server since the appliances work together. Hence, Embodiment 1 makes possible providing the most suitable UI for the user.

Embodiment 2

Described next is a UI control apparatus according to Embodiment 2 of the present invention.

In using a UI control apparatus 800 according to Embodiment 2 of the present invention, for example, the user 210 may ask for a resource found in the remote appliance 120, such as a picture, when the user 210 exchanges a UI program having the picture display function with the remote appliance 120. In the case where the resource is supposed to be used to display a UI (information on execution of the UI program), the user 210 needs to use the resource when the user 210 desires to have a UI displayed, the UI which is the same UI (information on execution of the UI program) as that displayed on the remote appliance 120.

Furthermore, assumed is the case of exchanging with the remote appliance 120 a UI program of a HTML browser, such as Internet Explorer (Registered Mark). Typically, when the UI program is obtained from the remote appliance 120, the UI is displayed with a use of the resource found in the remote appliance 120 unless otherwise designated.

In the above case, the use of the resource found in the remote appliance 120 allows the user 210 to handle the UI as if he or she used the UI via the remote appliance 120.

Hence, the UI control apparatus 800 according to Embodiment 2 of the present invention has as an object to make the resource in the remote appliance 120 available so that the UI could be handled via the remote appliance 120.

Here, the resource is at least one of picture data, image data, and audio data required in executing a UI program. For example, the resource is AV content, such as pictures, videos, and music. Furthermore, the resource may be information unique to the appliance, such as operation history of the user 210.

Described hereinafter is a UI control apparatus 800 according to Embodiment 2 of the present invention with reference to the drawings.

Figure 8:
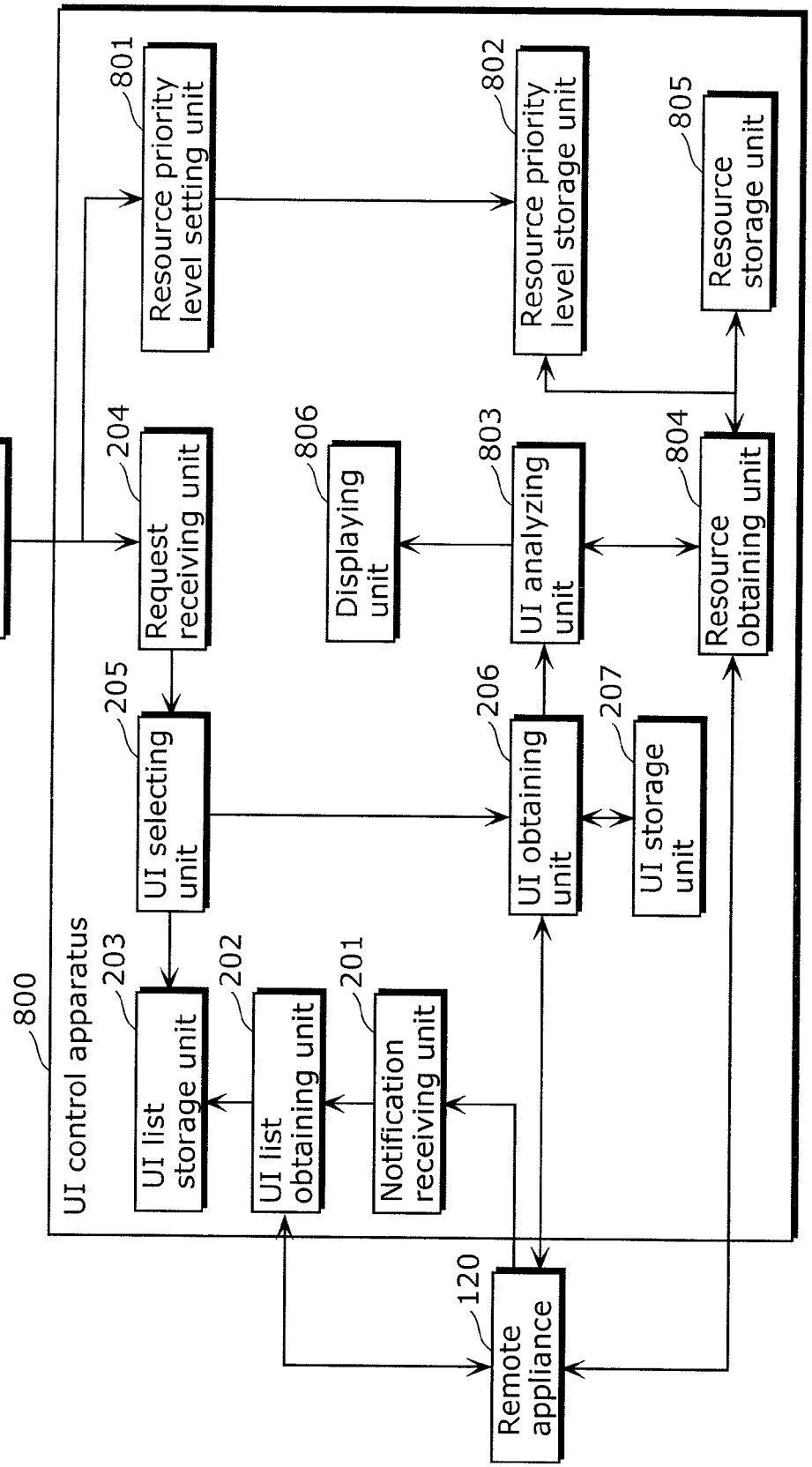
FIG. 8 shows a UI control apparatus according to Embodiment 2 of the present invention.

FIG. 8 shows the UI control apparatus 800 according to Embodiment 2. Included in an appliance, such as the above described TV, the UI control apparatus 800 implements a user interface function. The UI control apparatus 800 includes the notification receiving unit 201, the UI list obtaining unit 202, the UI list storage unit 203, the request receiving unit 204, the UI selecting unit 205, the UI obtaining unit 206, the UI storage unit 207, a resource priority level setting unit 801, a resource priority level storage unit 802, a UI analyzing unit 803, a resource obtaining unit 804, a resource storage unit 805, and a displaying unit 806. FIG. 2 also includes the remote appliance 120 and the user 210.

Embodiment 2 shares the same numerical references as those in Embodiment 1, and thus, the details thereof shall be omitted. Embodiment 2 is different from Embodiment 1 in having the resource priority level setting unit 801, the resource priority level storage unit 802, the UI analyzing unit 803, the resource obtaining unit 804, the resource storage unit 805, and the displaying unit 806.

The resource priority level setting unit 801 sets (determines) a use priority between resources held in the local appliance 101 and in the remote appliance 120. The priority level between the resources may be previously determined. Furthermore, the resource priority level setting unit 801 may set a use of a resource found in the remote appliance 120 obtaining a UI program. The resource priority level setting unit 801 may also set a use of the most suitable resource found not only in the remote appliance 120 obtaining the UI program, but also in the other appliances.

The resource priority level storage unit 802 is a memory to store information set in the resource priority level setting unit 801.

The UI analyzing unit 803 analyses the UI program obtained by the UI obtaining unit 206 to have necessary resource information. Then, the UI analyzing unit 803 instructs the resource obtaining unit 804 to obtain the resource. Using the resource provided from the resource obtaining unit 804, the UI analyzing unit 803 instructs the displaying unit 806 to re-display the UI (information on execution of the UI program).

The resource obtaining unit 804 uses the resource information provided from the UI analyzing unit 803 and the resource priority level stored in the resource priority level storage unit 802 to obtain a resource to be displayed in the displaying unit 806.

The resource storage unit 805 stores the resource.

In addition to the function of the displaying unit 208 according to Embodiment 1, the displaying unit 806 is capable of displaying the resource obtained by the resource obtaining unit 804.

Figure 9:
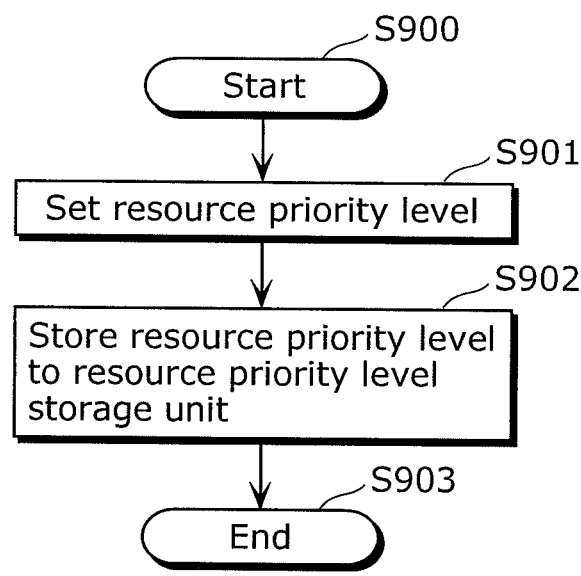
FIG. 9 is a flow chart showing a flow of storing a resource priority level according to Embodiment 2 of the present invention.

FIG. 9 is a flow of storing the resource priority level.

The processing starts (S900). When the user 210 sets the resource on the resource priority level setting unit 801, the resource priority level setting unit 801 sets the resource priority level (S901). Then, the resource priority level setting unit 801 stores the resource priority level set by the user 210 in the resource priority level storage unit 802. The processing ends (S903).

Figure 10:
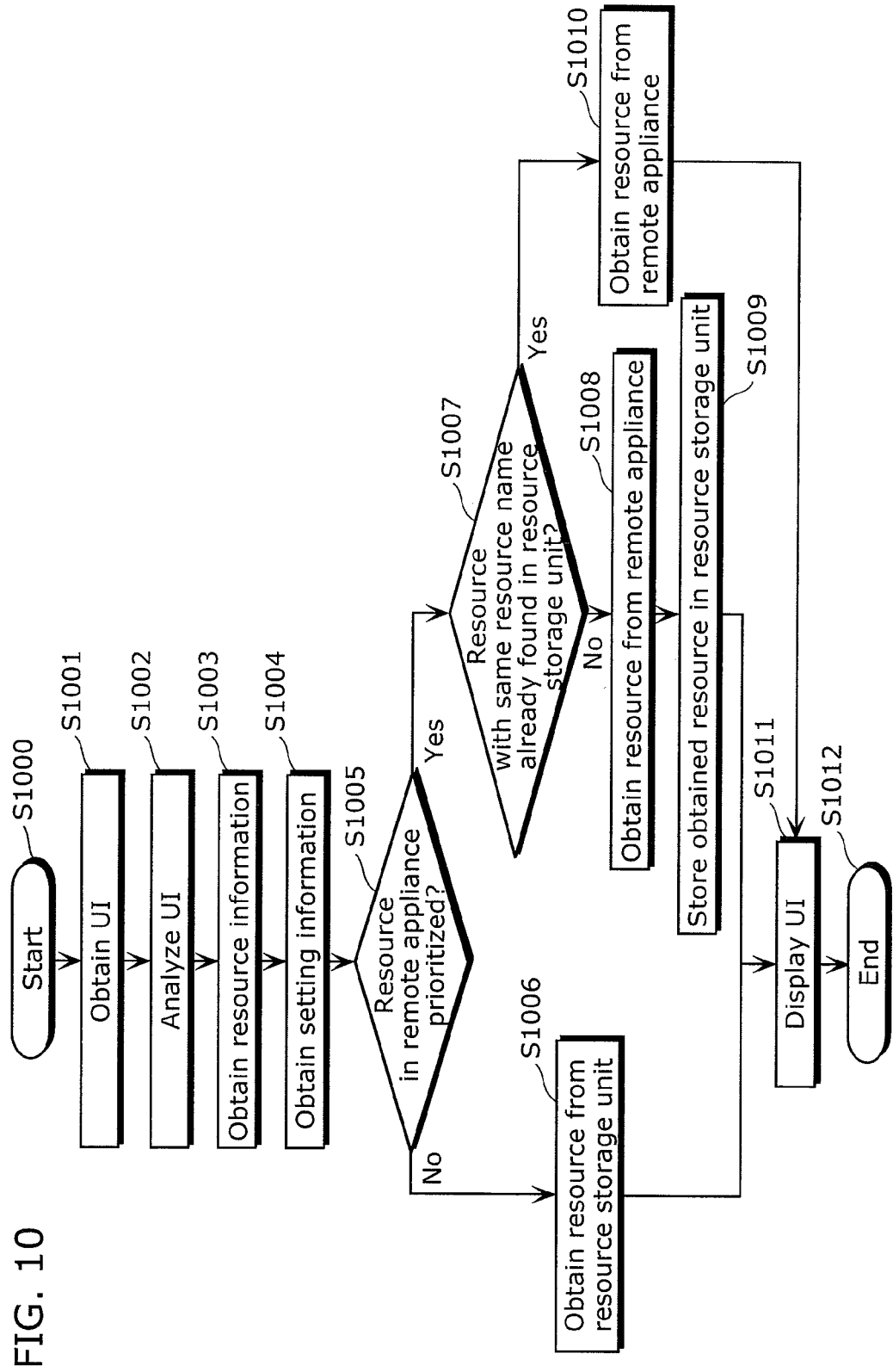
FIG. 10 is a flow chart showing a flow of displaying information on execution of a UI program according to Embodiment 2 of the present invention.

FIG. 10 is a flow of the UI analyzing unit 803 obtaining the UI program from the UI obtaining unit 206 through displaying the UI (information on execution of the UI program).

The processing starts (S1000). Upon obtaining the UI program from the UI obtaining unit 206 (S1001), the UI analyzing unit 803 analyses the obtained UI program (S1002). The analyzing shall be detailed hereinafter. Then, the UI analyzing unit 803 analyzes the obtained UI program to have necessary resource information (S1003). When determining out of the resource information that a picture resource has to be used, for example, the UI analyzing unit 803 requests the resource obtaining unit 804 to obtain the picture resource. Receiving the request from the UI analyzing unit 803, the resource obtaining unit 804 obtains from the resource priority level storage unit 802 the setting information indicating the obtainment priority between the resources held in the local appliance 101 and the remote appliance 120 (S1004). The resource obtaining unit 804 uses the obtained setting information to confirm the use priority between the resources held in the local appliance 101 and in the remote appliance 120 (S1005). When the resource held in the local appliance 101 is prioritized for use (S1005: No), the resource obtaining unit 804 obtains the resource from the resource storage unit 805 (S1006). When the resource priority level setting unit 801 prioritizes to use the resource held in the remote appliance 120 (S1005: Yes), the resource obtaining unit 804 confirms whether or not there is a resource whose name is identical to the name of the prioritized resource, in the resource storage unit 805 (S1007). When no such resource whose name is identical to the name of the prioritized resource is found in the resource storage unit 805 (S1007: No), the resource obtaining unit 804 obtains the prioritized resource from the remote appliance 120 obtaining the UI program (S1008), and stores the obtained resource in the resource storage unit 805 (S1009). When such a resource whose name is identical to the name of the prioritized resource is found in the resource storage unit 805 (S1007: Yes), the resource obtaining unit 804 obtains the resource having the identical name from the remote appliance 120 obtaining the UI program (S1010). Then, the displaying unit 806 uses the obtained UI program and the resource to display the UI (information on execution of the UI program) (S1011). The processing ends (S1012).

FIG. 11 exemplifies an obtained UI program 1100. A statement 1103 is a function referred to as "function loadBody" to be called when the whole UI program is loaded. A statement 1104 is an HTML element used for displaying a picture. A statement 1101 describes the details of the function-to-be-called "function loadBody". A statement 1102, describing the details of "function loadBody", defines processing to cause the HTML element with the ID "photo1" to display a picture referred to as "A. jpg".

Figure 12A:
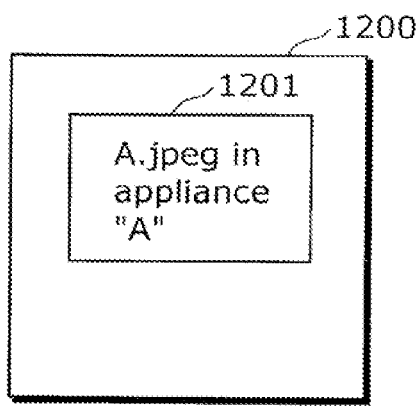
FIGS. 12(A) and 12(B) respectively show (i) a display monitor displaying picture resources stored in an appliance "A" according to Embodiment 2 of the present invention, and (ii) a display monitor displaying picture resources stored in an appliance "B" according to Embodiment 2 of the present invention.
Figure 12B:
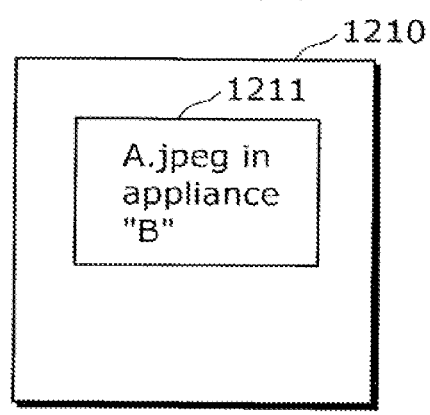

FIG. 12 show (i) a monitor display example 1200 displaying a picture resource 1201 held in the appliance "A" in a form of a UI (FIG. 12 (A)), and (ii) a monitor display example 1210 displaying a picture resource 1211 held in the appliance "B" in a form of a UI (FIG. 12 (B)).

Figure 13:
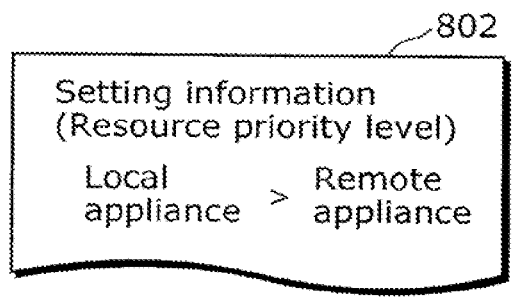
FIG. 13 exemplifies setting information stored in a resource priority level storage unit according to Embodiment 2 of the present invention.

Described here is a case where: the UI program shown in FIG. 11 is obtained from the remote appliance 120; and there has been a resource, having an identical name to that of the resource held in the remote appliance 120, in the resource storage unit 805. In the description, the local appliance 101 is referred to as the appliance "A", and the remote appliance 120 as the appliance "B". Here, the UI analyzing unit 803 obtains the UI program from the UI obtaining unit 206 (S1001) to analyze the obtained UI program (S1002). Then, the UI analyzing unit 803 obtains the resource information showing that the necessary resource is "A. jpg" (S1003), and the resource obtaining unit 804 obtains the setting information (S1004). When the setting information stored in the resource priority level storage unit 802 is set so as to prioritize the resource held in the local appliance 101, as shown in FIG. 13 (S1005: No), the resource obtaining unit 804 obtains "A. jpg" from the resource storage unit 805 (S1006). The displaying unit 806 uses "A. jpg" of the appliance "A" to display a UI, as shown in the monitor display example 1200 of FIG. 13 (A) (S1011). Suppose the setting information stored in the resource priority level storage unit 802 is set so as to prioritize the resource held in the remote appliance 120 (S1005:Yes). Since expected here is a case where a resource name, identical to the name of the prioritized resource, is found in the resource storage unit 805 (S1007: Yes), the resource obtaining unit 804 obtains "A. jpg" from the remote appliance 120 (S1010). The displaying unit 806 uses "A. jpg" of the appliance "B" to display a UI, as shown in the monitor display example 1210 of FIG. 13 (B) (S1011).

As described above, the implementation of the present invention makes a resource held in the remote appliance 120 available by setting a resource priority level. This allows the user 210 to handle the UI as if he or she used the UI via the remote appliance 120. Suppose the case where a UI program of a HTML program, such as Internet Explorer (Registered Mark), is exchanged with the remote appliance 120, for example. Typically, when the UI program is obtained from the remote appliance 120, the UI is displayed with a use of the resource found in the remote appliance 120 unless otherwise designated. In Embodiment 2, concurrently, the resource held in the remote appliance 120 is available. This allows the user 210 to handle the UI as if he or she used the UI via the remote appliance 120.

Embodiment 3

Described next is a UI control apparatus according to Embodiment 3 of the present invention.

In the case where a comparison shows that the UI in the remote appliance 120 is more convenient than that in the local appliance 101, a UI control apparatus 1300 according to Embodiment 3 of the present invention can use the more convenient UI in the remote appliance 120. Described hereinafter is the UI control apparatus 1300 according to Embodiment 3 of the present invention with reference to the drawings.

Figure 14:
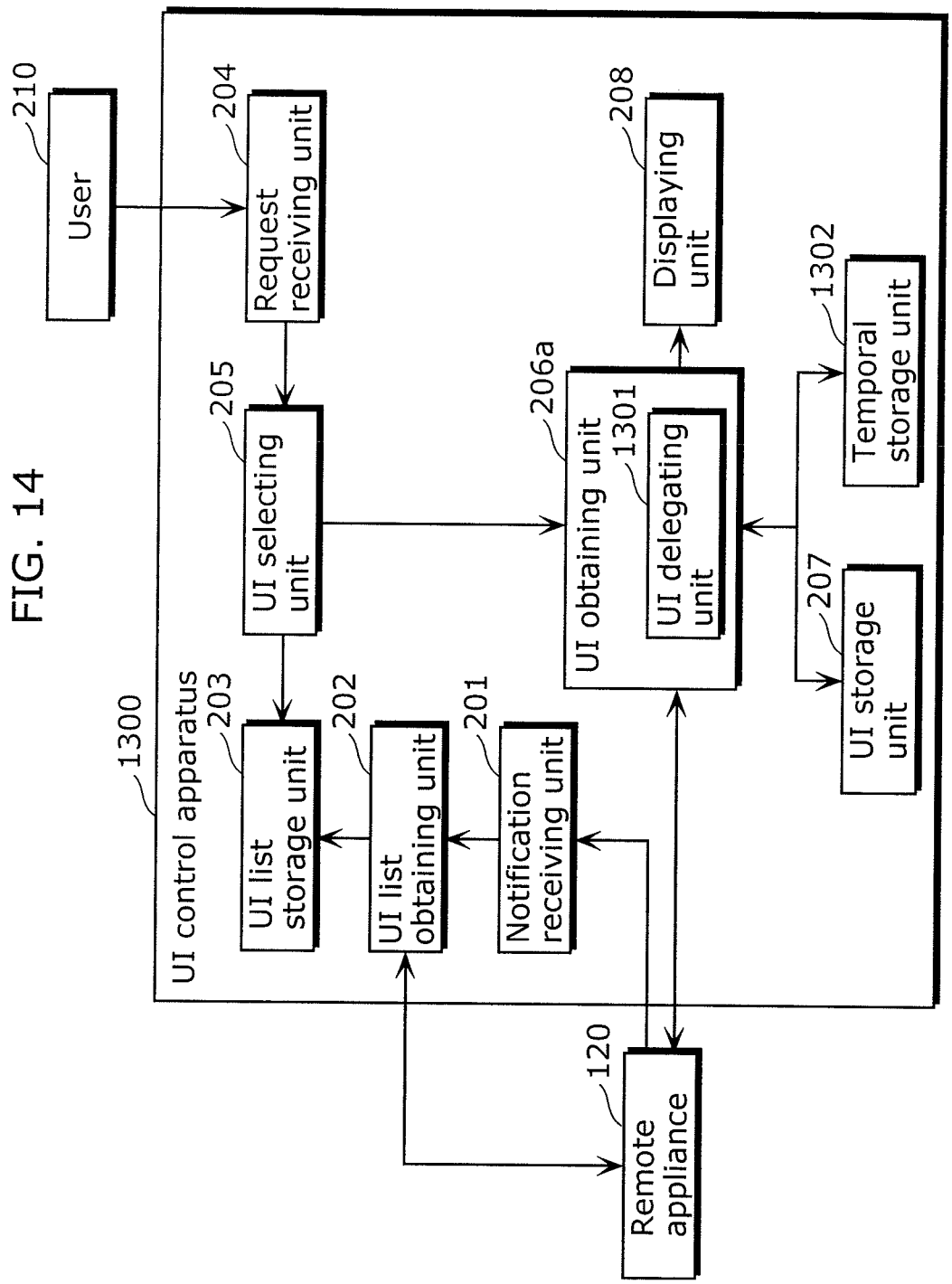
FIG. 14 shows a UI control apparatus according to Embodiment 3 of the present invention.

FIG. 14 shows the UI control apparatus 1300 according to Embodiment 3. The UI control apparatus 1300 is included in an appliance such as a TV, and achieves a user interface function. The UI control apparatus 1300 includes the notification receiving unit 201, the UI list obtaining unit 202, the UI list storage unit 203, the request receiving unit 204, the UI selecting unit 205, the UI obtaining unit 206a, the UI storage unit 207, a temporal storage unit 1302, and the displaying unit 208. FIG. 14 also includes the remote appliance 120 and the user 210.

Embodiment 3 shares the same numerical references as those in Embodiment 1, and thus, the details thereof shall be omitted. Embodiment 3 is different from Embodiment 1 in that the UI obtaining unit 206a includes a UI delegating unit 1301 and the temporal storage unit 1302 in addition to the UI obtaining unit 206 found in Embodiment 1.

The UI delegating unit 1301 delegates execution of a UI program. Specifically, the UI delegating unit 1301 delegates execution of a UI program to a remote appliance when the UI obtaining unit 206a determines that the UI program, selected by the UI selecting unit 205, is not stored in the UI storage unit 207.

The temporal storage unit 1302 is a memory to temporarily store an input result which the UI delegating unit 1301 receives from the request receiving unit 204 via the UI selecting unit 205.

Figure 15:
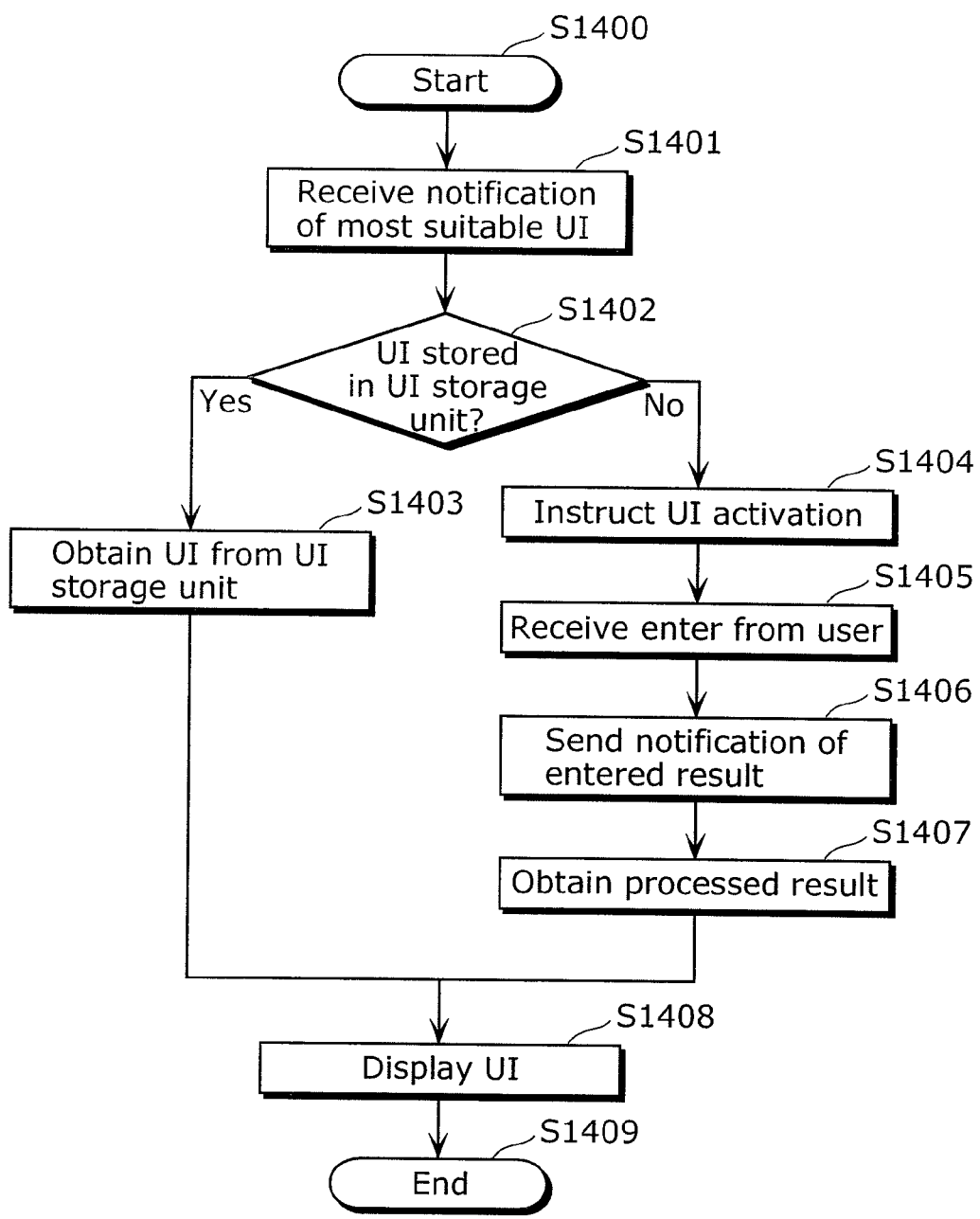
FIG. 15 is a flow chart showing a flow of displaying information on execution of a UI program according to Embodiment 3 of the present invention.

FIG. 15 is a flow of receiving notification of the most suitable UI program from the UI selecting unit 205 through displaying the UI (information on execution of the UI program). The processing starts (S1400). Upon receiving the notification of the most suitable UI program from the UI selecting unit 205 (S1401), the UI obtaining unit 206a confirms whether or not the UI storage unit 207 stores a UI program selected by the UI selecting unit 205 (S1402). When the UI storage unit 207 stores the UI program selected by the UI selecting unit 205 (S1402:Yes), the UI obtaining unit 206a obtains the UI program from the UI storage unit 207 (S1403). When the UI storage unit 207 stores no UI program selected by the UI selecting unit 205 (S1402: No), the UI delegating unit 1301 activates a UI program held in the remote appliance 120 on the remote appliance 120 (S1404). Upon receiving the result entered by the user 210 via the request receiving unit 204 (S1405), the UI delegating unit 1301 stores the entered result in the temporal storage unit 1302. Then, at certain timing, the UI delegating unit 1301 notifies the remote appliance 120 of the entered result stored in the temporal storage unit 1302 (S1406). The timing may be either set by the user 210 or predetermined by the UI control apparatus 1300. When the UI program is for a text editing UI, the timing may be either when an entered text message is converted, or when each character is converted. Then, the UI delegating unit 1301 receives the result processed by the remote appliance 120 (S1407), and instructs the displaying unit 208 to display the UI based on the result. The displaying unit 208 receives the instruction and displays the UI (S1408). The processing ends (S1409).

Suppose the case where the user 210 requests the request receiving unit 204 to let the user 210 use the text editing UI. Here, the request receiving unit 204 instructs the UI selecting unit 205 to select the most suitable text editing UI program for the user 210. Suppose here that the instructed UI selecting unit 205 selects a text editing UI whose address is "http://B/fepUI.html". Upon receiving the instruction from the UI selecting unit 205, the UI obtaining unit 206a refers to the UI storage unit 207 to confirm whether or not the text editing UI program whose address is "http://B/fepUI.html" is stored. In the case where the text editing UI program is stored, the UI obtaining unit 206a instructs the displaying unit 208 to display the UI (information on execution of the UI program). In the case where no such text editing program is stored, the UI delegating unit 1301 requests the remote appliance 120 to activate the text editing program whose address is "http://B/fepUI.html". Then, when the user 210 enters a character via the request receiving unit 204, the entered result is reflected on the text editing UI program of the remote appliance 120. The timing of the reflection may be either when each character is entered or when the user 210 converts the text. When the text has been entered in the text editing UI program of the remote appliance 120, the result processed on the text editing UI program of the remote appliance 120 is notified to the UI delegating unit 1301. The UI delegating unit 1301 notifies the displaying unit 208 of the processing result. The displaying unit 208 receives the notification and displays the UI.

As described above, the present invention allows the user 210 to use the text editing UI of the remote appliance 120. Hence, the present invention makes possible executing the most suitable UI program for the user 210 even in the case where (i) the user 210 feels troublesome to download a UI program, and (ii) a storage area is running out for downloading a UI program.

It is noted that the user may directly activate the text editing UI program of the remote appliance 120. The UI delegating unit 1301 may detect an interruption of the delegated UI program (executing another operation, a network shutdown, and a low battery) running.

Exemplified below is an operation display used for delegating a UI with reference to FIG. 16. Connected to a player 1501, a TV 1500 in FIG. 16 displays an output which the player 1501 provides. The player 1501 is an example of a local appliance, and replays a medium such as a Blu-ray disc (BD), a digital versatile disc (DVD), and a compact disc (CD). A cellular phone 1502 is an example of a remote appliance, and found in the same home network 100 in which the player 1501 is found. A player operating display 1510 is used for editing text on the player 1501. A cellular phone operating display 1511 appears on the cellular phone 1502 for editing text. A text editing display 1512 appears when the user 210 makes a text entry request such as editing a title (an operation process 1) to the player 1501. Exemplified here is the case where text editing, which is supposed to be carried out on the player 1501, is executed on the cellular phone 1502.

In activating a text editing display to be appeared on the cellular phone 1502 (a text editing display 1513) via the UI delegating unit 1301 (an operating process 2), the text editing display 1512 may show to which appliance the UI delegating unit 1301 delegates the display. On a text editing display 1514, the user 210 uses a text editing UI program stored in the cellular phone 1502 to enter text. When the user 210 finishes entering the text editing (an operation process 3), the cellular phone 1502 returns the text entry result to the UI delegating unit 1301 (an operation process 4). The player 1501 reflects the text entry result (an operation process 5) entered on the cellular phone 1502 as the results entered on the player 1501 (a text editing display 1515). Here, the text entry result may be reflected on a text entry dictionary database held in the player 1501, as well as on the display.

Figure 16:
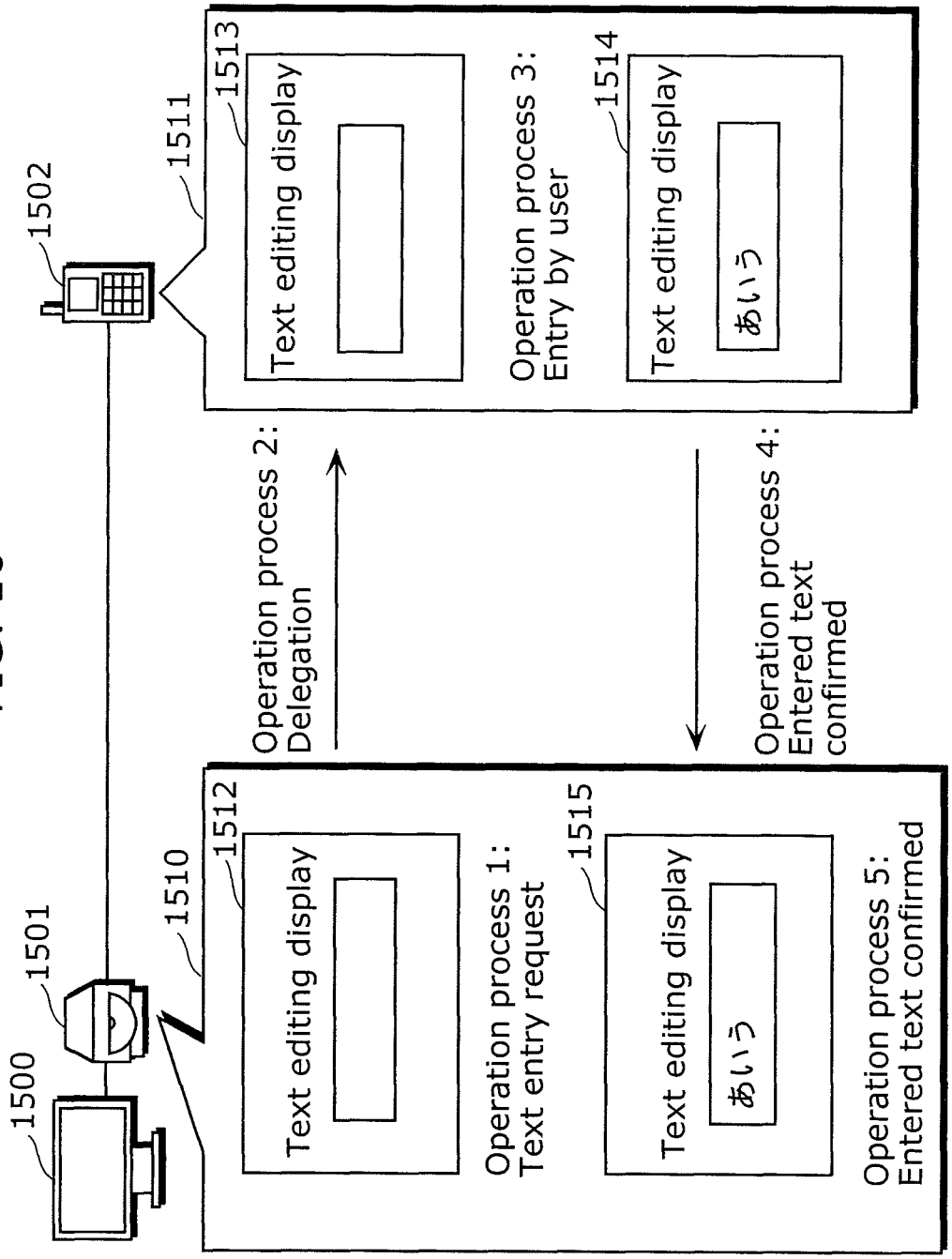
FIG. 16 exemplifies an operation display used for delegating a UI according to Embodiment 3 of the present invention.

FIG. 16 shows an example of an operating display used for entering text; however, the operating display shall not be limited to text entry. Via the operating display, a DVD recorder may record an image, the resulting recorded image may be provided to a DVD player, and the result recorded on the DVD player may be stored.

As described above, the present invention allows the user to use the UI of the remote appliance 120 in the case where the UI held in the remote appliance 120 is more convenient than the UI held in the local appliance 101. Hence, the present invention makes possible executing the most suitable UI program for the user 210 even in the case where (i) the user 210 feels troublesome to download a UI program, and (ii) a storage area is running out for downloading a UI program.

Embodiment 4

Described next is a UI control apparatus according to Embodiment 4 of the present invention.

Described hereinafter is a UI control apparatus 1600 according to Embodiment 4 of the present invention with reference to the drawings. Embodiment 4 is equivalent to Embodiment 3 having the UI program replaced with "function". Here, "function" represents a function carried out by an appliance including a UI control apparatus. Specifically, the function represents a program and data to carry out a function of the appliance, as well as a UI program.

Figure 17:
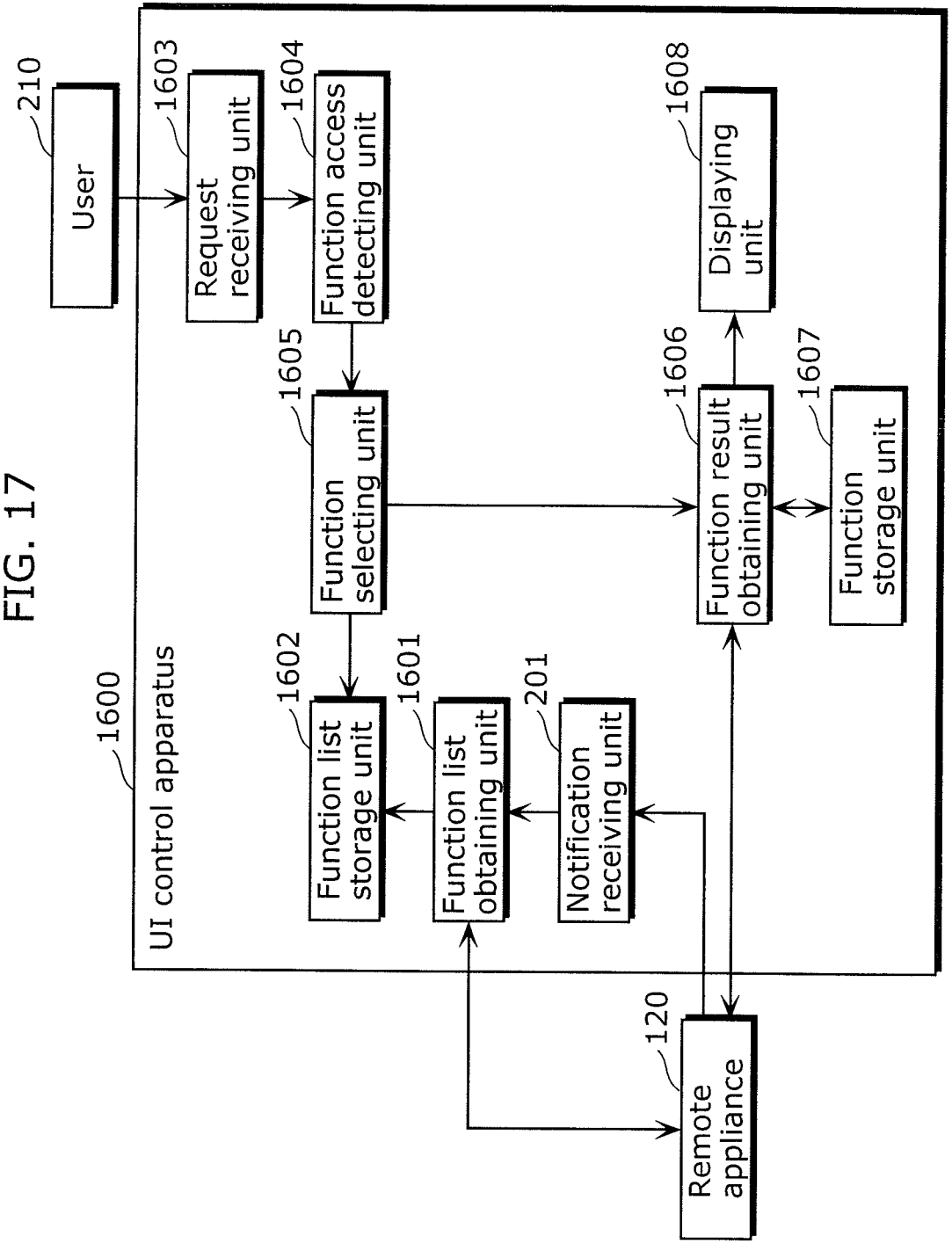
FIG. 17 shows a UI control apparatus according to Embodiment 4 of the present invention.

FIG. 17 shows the UI control apparatus 1600 according to Embodiment 4. The UI control apparatus 1600 is included in an appliance such as a TV, and carries out various functions. The UI control apparatus 1600 includes the notification receiving unit 201, a function list obtaining unit 1601, a function list storage unit 1602, a request receiving unit 1603, a function access detecting unit 1604, a function selecting unit 1605, a function result obtaining unit 1606, a function storage unit 1607, and a displaying unit 1608. FIG. 17 also includes the remote appliance 120 and the user 210.

Embodiment 4 shares the same numerical references as those in Embodiment 1, and thus, the details thereof shall be omitted. Embodiment 4 is different from Embodiment 1 in having the function list obtaining unit 1601, the function list storage unit 1602, the request receiving unit 1603, the function access detecting unit 1604, the function selecting unit 1605, the function result obtaining unit 1606, the function storage unit 1607, and the displaying unit 1608.

The function in Embodiment 4 represents a function for (i) controlling the remote appliance 120, such as timer recording a program, analyzing a moving image, and editing text, and (ii) gaining an access to hardware.

The function list obtaining unit 1601 shown in FIG. 17 obtains a list of functions from the remote appliance 120. In the case where there are two or more of the remote appliances 120, lists of UI programs may be obtained from all of the appliances. Then, the obtained function list is stored in the function list storage unit 1602. The function list storage unit 1602 stores a list of functions and corresponding addresses thereof. Upon receiving a UI request from the user 210, the request receiving unit 1603 sends the function access detecting unit 1604 notification to cause the function access detecting unit 1604 to carry out access detection. Then, receiving the notification, the function access detecting unit 1604 detects whether or not the UI requested by the user 210 has gained an access to a function either the local appliance 101 or the remote appliance 120 has. When detecting the UI gaining an access to the function, the function access detecting unit 1604 sends the function selecting unit 1605 notification to cause the function selecting unit 1605 to select the function.

Suppose the case where the user 210 requests the request receiving unit 1603 to let the user 210 use a UI "A". Here, when the function access detecting unit 1604 detects the fact that the UI "A" has gained an access to a function held in either the local appliance 101 or the remote appliance 120, the function access detecting unit 1604 sends the function selecting unit 1605 notification to cause the function selecting unit 1605 to select the most suitable function for the user 210.

Upon receiving the notification, the function selecting unit 1605 selects an address of an appliance having the most suitable function which the user 210 desires to use out of the function list stored in the function list storage unit 1602. The address may be provided in the HTTP. The protocol shall not be limited to the HTTP as far as the address can specify the appliance.

Then, the function result obtaining unit 1606 notifies the function result obtaining unit 1606 of the address. Based on the address notified by the function selecting unit 1605, the function result obtaining unit 1606 which has received the notification confirms whether or not the function storage unit 1607 has the function selected by the function selecting unit 1605. In the case where the function selected by the function selecting unit 1605 is found in the function storage unit 1607, the function result obtaining unit 1606 obtains the result of executing the function. In the case where the function storage unit 1607 has no function selected by the function selecting unit 1605, the function result obtaining unit 1606 causes the remote appliance 120 to execute the function and obtain the execution result from the remote appliance 120. Then, the function result obtaining unit 1606 sends the displaying unit 1608 notification to cause the displaying unit 1608 to display the execution result.

It is noted that a priority level of a function may be used to tell which function is prioritized, the function held in either the local appliance 101 or the remote appliance 120. Here, the remote appliance 120 may obtain a UI. Regardless of the remote appliance 120 obtaining a UI, any appliance may be employed as far as the appliance has the most suitable function. The priority level of the function may be either predetermined, or set by the user 210.

In the above case, upon receiving the address of the function selected by the function selecting unit 1605, the function result obtaining unit 1606 uses the priority level of the function to confirm from which appliance the function result should be obtained. In the case where the local appliance has a higher function result, the function result obtaining unit 1606 obtains the function from the function storage unit 1607, and obtains the result of executing the function. In the case where the remote appliance 120 has a higher function result, the function result obtaining unit 1606 causes the remote appliance 120 to execute the function, and obtains the execution result from the remote appliance 120.

Embodiment 4 involves obtaining a required function from a remote appliance and executing the function without a data management server since the appliances work together, and thus makes possible providing the most suitable function for the user.

It is noted that Embodiment 4 is equivalent to Embodiment 3 having the UI program replaced with "function". Concurrently, the present invention shall not be limited to this; that is, the present invention may be achieved by replacing the UI program described in Embodiments 1 and 2 with "function".

Although only Embodiments 1 to 4 of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

Furthermore, the present invention may be implemented as a UI control method, a UI control program, and a storage medium storing the UI control program, as well as the UI control apparatus according to Embodiments 1 to 4.

In addition, the present invention may be implemented as an integrated circuit such as a Large Scale Integrated circuit (LSI) formed on a single semiconductor substrate. Here, a structural element to be implemented as a single-chip integrated circuit may include (i) all or some of the structural elements according to each of Embodiments 1 to 4, and (ii) a structural element of an appliance including the UI control apparatus. In Embodiment 1, for example, implemented as the single-chip integrated circuit may be the notification receiving unit 201, the UI list obtaining unit 202, the UI list storage unit 203, the request receiving unit 204, the UI selecting unit 205, the UI obtaining unit 206, the UI storage unit 207, and a part of the displaying unit 208 other than the display.

INDUSTRIAL APPLICABILITY

A UI control apparatus, a UI control method, a computer program using the UI control method, a storage medium storing the computer program, and a UI control integrated circuit of the present invention are effective in causing appliances to work together and providing the suitable UI for the user without a data management server. In particular, the UI control apparatus is effectively used for a TV, a recorder, a player, a cellular phone, a fixed-line phone, a printer, a FAX machine, a PDA, a PC, a digital camera, a refrigerator, a microwave, and a washing machine.

The invention claimed is:
1. A user interface (UI) control apparatus comprising:
a UI list storage unit configured to store a UI list which is information listing at least one UI program stored in said UI control apparatus;
a UI list obtaining unit configured to add information on a UI program stored in a remote appliance to the UI list stored in said UI list storage unit, the remote appliance being connected to said UI control apparatus via a communication path, and the UI list including, for each of a plurality of UI programs registered in the UI list, information indicating (i) a function of the UI program, (ii) an appliance which holds the UI program and a location of the UI program in the appliance, and (iii) at least one of a version and a usability of the UI program;
a UI obtaining unit configured to, in a case where a UI program selected by a user from the UI list with the UI program added to the UI list is not stored in said UI control apparatus,
  (i) search the remote appliance for the selected UI program by identifying, from among the plurality of UI programs registered in the UI list, a UI program (a) having a function that is the same as a function of the selected UI program, (b) having at least one of a version and a usability higher than at least one of a version and a usability of the selected UI program, and (c) being held in the remote appliance, and
  (ii) obtain the identified UI program from the remote appliance; and
a displaying unit configured to display, by executing the obtained UI program, a UI on a display of either said UI control apparatus or an appliance including said UI control apparatus.

2. The UI control apparatus according to claim 1, further comprising:
a UI storage unit;
a request receiving unit; and
a UI selecting unit,
wherein the executed UI program is used for executing a function in response to an instruction given by a user,
wherein said UI storage unit is configured to store (i) the obtained UI program and (ii) the at least one UI program stored in said UI control apparatus,
wherein said request receiving unit is configured to receive a request from the user for a UI which the user desires, and
wherein said UI selecting unit is configured to select a UI program, as the selected UI program, corresponding to the requested UI out of at least one UI program registered in the UI list with the information on the UI program added to the UI list.

3. The UI control apparatus according to claim 2,
wherein the UI list includes, for each of a plurality of UI programs registered in the UI list, information indicating a priority level of the UI program, and
wherein said UI selecting unit is configured to select the UI program by referring to the priority level included in the UI list.

4. The UI control apparatus according to claim 2,
wherein the UI list includes, for each of a plurality of UI programs registered in the UI list, information indicating an address indicating a storage location of the UI program in said UI storage unit, and
wherein said UI obtaining unit is configured to obtain, by referring to the address found in the UI list, the UI program from the storage location indicated in the address corresponding to the UI program selected by said UI selecting unit.

5. The UI control apparatus according to claim 2,
wherein said UI obtaining unit further includes a UI delegating unit configured to delegate, to the remote appliance, execution of the UI program selected by said UI selecting unit in the case where said UI selecting unit determines that the UI program is not stored in said UI storage unit.

6. The UI control apparatus according to claim 5,
wherein said UI delegating unit is configured to receive, from the remote appliance, a result of processing executed on the delegated execution of the UI program selected by said UI selecting unit, and
wherein said displaying unit is configured to display the result received by said UI delegating unit.

7. The UI control apparatus according to claim 1, further comprising
a notification receiving unit configured to receive notification indicating that the remote appliance has established a connection to the communication path,
wherein said UI list obtaining unit is configured to obtain the information on the UI program stored in the remote appliance from the remote appliance in the case where said notification receiving unit receives the notification.

8. The UI control apparatus according to claim 1, further comprising:
a resource analyzing unit configured to analyze the UI program obtained by said UI obtaining unit to specify a resource including at least one of picture data, image data, and audio data which are required when the obtained UI program is executed; and
a resource obtaining unit configured to obtain the resource from either the appliance or the remote appliance, the resource being specified by said resource analyzing unit,
wherein said displaying unit is configured to display the resource obtained by said resource obtaining unit when executing the obtained UI program.

9. The UI control apparatus according to claim 8, further comprising:
a resource priority level storage unit configured to store a priority level as a source of obtaining the resource, the priority level representing information on priority set between the appliance and the remote appliance,
wherein said resource obtaining unit is configured to obtain the resource from either the appliance or the remote appliance based on the priority level stored in said resource priority level storage unit.

10. The UI control apparatus according to claim 1,
wherein the obtained UI program is executed on a virtual machine and described in a script language, and
wherein the appliance and the remote appliance include an interpreter for the virtual machine and the script language.

11. A communications system comprising
a plurality of electronic appliances connected via a communication path,
wherein each of said plurality of electronic appliances includes a user interface (UI) control apparatus, and
wherein the UI control apparatus includes:
a UI list storage unit configured to store a UI list which is information listing at least one UI program stored in said UI control apparatus;
a UI list obtaining unit configured to add information on a UI program stored in a remote appliance to the UI list stored in said UI list storage unit, the remote appliance being connected to the UI control apparatus via the communication path, and the UI list including, for each of a plurality of UI programs registered in the UI list, information indicating (i) a function of the UI program, (ii) an appliance which holds the UI program and a location of the UI program in the appliance, and (iii) at least one of a version and a usability of the UI program;
a UI obtaining unit configured to, in a case where a UI program selected by a user from the UI list with the UI program added to the UI list is not stored in said UI control apparatus,
(i) search the remote appliance for the selected UI program by identifying, from among the plurality of UI programs registered in the UI list, a UI program (a) having a function that is the same as a function of the selected UI program, (b) having at least one of a version and a usability higher than at least one of a version and a usability of the selected UI program, and (c) being held in the remote appliance, and
(ii) obtain the identified UI program from the remote appliance; and
a displaying unit configured to display, by executing the obtained UI program, a UI on a display of either the UI control apparatus or an appliance including the UI control apparatus.

12. A method of controlling a user interface (UI) control apparatus, the UI control apparatus including a UI list storage unit configured to store a UI list which is information listing at least one UI program stored in the UI control apparatus, said method comprising:
adding information on a UI program stored in a remote appliance to the UI list stored in the UI list storing unit, the remote appliance being connected to the UI control apparatus via a communication path, and the UI list including, for each of a plurality of UI programs registered in the UI list, information indicating (i) a function of the UI program, (ii) an appliance which holds the UI program and a location of the UI program in the appliance, and (iii) at least one of a version and a usability of the UI program;
in a case where a UI program selected by a user from the UI list with the UI program added to the UI list is not stored in the UI control apparatus, (i) searching the remote appliance for the selected UI program by identifying, from among the plurality of UI programs registered in the UI list, a UI program (a) having a function that is the same as a function of the selected UI program, (b) having at least one of a version and a usability higher than at least one of a version and a usability of the selected UI program, and (c) being held in the remote appliance, and (ii) obtaining the identified UI program from the remote appliance; and displaying, through execution of the obtained UI program, a UI on a display of either the UI control apparatus or an apparatus including the UI control apparatus.

13. A non-transitory computer readable recording medium having stored thereon program instructions for causing a computer device having execution means to execute program instructions, wherein the program instructions comprise:

instruction means for adding information on a user interface (UI) program stored in a remote appliance to a UI list which is information listing at least one UI program stored in a UI list storage unit included in a UI control apparatus, the remote appliance being connected to the UI control apparatus via a communication path, and the UI list including, for each of a plurality of UI programs registered in the UI list, information indicating (i) a function of the UI program, (ii) an appliance which holds the UI program and a location of the UI program in the appliance, and (iii) at least one of a version and a usability of the UI program;

instruction means for, in a case where a UI program selected by a user from the UI list with the UI program added to the UI list is not stored in the UI control apparatus, (i) searching the remote appliance for the selected UI program by identifying, from among the plurality of UI programs registered in the UI list, a UI program (a) having a function that is the same as a function of the selected UI program, (b) having at least one of a version and a usability higher than at least one of a version and a usability of the selected UI program, and (c) being held in the remote appliance, and (ii) obtaining the identified UI program from the remote appliance; and instruction means for displaying, through execution of the obtained UI program, a UI on a display of either the UI control apparatus or an apparatus including the UI control apparatus.

14. An integrated circuit for use in a user interface (UI) control apparatus, said integrated circuit comprising:

a UI list storage unit configured to store a UI list which is information listing at least one UI program stored in said UI control apparatus;

a UI list obtaining unit configured to add information on a UI program stored in a remote appliance to the UI list stored in said UI list storage unit, the remote appliance being connected to the UI control apparatus via a communication path, and the UI list including, for each of a plurality of UI programs registered in the UI list, information indicating (i) a function of the UI program, (ii) an appliance which holds the UI program and a location of the UI program in the appliance, and (iii) at least one of a version and a usability of the UI program;

a UI obtaining unit configured to, in a case where a UI program selected by a user from the UI list with the UI program added to the UI list is not stored in said UI control apparatus,
(i) search the remote appliance for the selected UI program by identifying, from among the plurality of UI programs registered in the UI list, a UI program (a) having a function that is the same as a function of the selected UI program, (b) having at least one of a version and a usability higher than at least one of a version and a usability of the selected UI program, and (c) being held in the remote appliance, and
(ii) obtain the identified UI program from the remote appliance; and a displaying unit configured to display, by executing the obtained UI program, a UI on a display of either the UI control apparatus or an appliance including the UI control apparatus.

\* \* \* \* \*